United States Patent [19]

Ballantyne

[11] Patent Number: 4,635,560
[45] Date of Patent: Jan. 13, 1987

[54] CONTACTLESS POWERING OF LIM VEHICLE ELECTRICAL SYSTEM BY RECOVERY OF LIM SLIP POWER

[75] Inventor: W. John Ballantyne, Kingston, Canada

[73] Assignee: Urban Transportation Development Corporation Limited, Toronto, Canada

[21] Appl. No.: 688,937

[22] Filed: Jan. 4, 1985

[51] Int. Cl.[4] .......................... B60L 1/00; B61B 13/08
[52] U.S. Cl. ..................................... 104/292; 104/290
[58] Field of Search ............... 104/288, 289, 290, 292, 104/295, 296; 310/12, 13; 318/135

[56] References Cited

U.S. PATENT DOCUMENTS 3,513,338  5/1970  Poloujadoff .......................... 104/289
4,061,089  12/1977  Sawyer ............................ 104/292 X
4,160,181  7/1979  Lichtenberg ........................ 104/289

Primary Examiner—Robert B. Reeves
Assistant Examiner—Edward M. Wacyra
Attorney, Agent, or Firm—Robert F. Delbridge; Arne I. Fors

[57] ABSTRACT

In a transportation system involving a track-side linear induction motor (LIM) primary and a vehicle carrying a LIM secondary, slip power in the secondary is recovered and used to power the on-board electrical system of the vehicle. The LIM secondary has a three-phase secondary winding rather than a conventional reaction plate. The winding is connected to a rectifier which converts slip current in the windings into electrical power for the on-board electrical system. This eliminates the necessity for any sliding contacts for power transfer, while simultaneously enabling at least part of the slip power, which is normally dissipated as heat in the secondary, to be recovered.

6 Claims, 10 Drawing Figures

CONTACTLESS POWERING OF LIM VEHICLE ELECTRICAL SYSTEM BY RECOVERY OF LIM SLIP POWER

FIELD OF THE INVENTION

The invention relates to linear induction motor (LIM) transportation systems, and in particular to the provision of power to an electrical system including lights, fans or other electrical apparatus on-board of a LIM vehicle.

BACKGROUND OF THE INVENTION

LIM transportation systems are well-known. The most common type involves a vehicle-borne primary which generates the moving magnetic field required to propel the vehicle and a track-side secondary which is simply a reaction rail with a steel backing member and an aluminum facing. The steel backing member together with the primary define a magnetic path for the magnetic field generated by the primary, and the aluminum facing provides a low resistance medium in which secondary currents necessary for generation of thrust are induced. In some applications, the reaction rail may be constructed as a ladder-like structure with transverse conductor bars of varying resistance to alter the thrust characteristics of the system. In theme-park and airport systems, the arrangement of the LIM primary and secondary are often reversed: a track-side primary is provided, and the vehicle carries the secondary, an aluminum-over-steel reaction plate, marginally spaced from the primary.

The present invention addresses the problem of providing power for the electrical system of a LIM vehicle which carries a LIM secondary. An advantage commonly touted for such systems is that no exposed trackside power rail is required. However, to supply auxiliary power for operation of lights and fans, etc, it is common, in known or proposed systems to provide track-side rails and contact shoes carried by the vehicle which slip over the surface of the power rails. This of course introduces the usual problems of sliding contacts which the track-based LIM primary is intended to eliminate.

Further, in induction motors, both linear and rotary, a portion of the power crossing the air gap from the primary to the secondary is not converted into mechanical power. Such power is called "slip power" and in simple, conventional motors it is dissipated as heat in the secondary. At high slip, the efficiency of an induction motor can be low, with a correspondingly high slip power loss. This is particularly important for LIM powered vehicles which may operate at high slips, for example when stopping and starting.

It has been proposed to recover slip power from the rotor or secondary of conventional induction motors and then to invert the power and feed it back into the supply line. Alternatively, the recovered power can be fed to supplementary stator coils. However, this proposal is for a rotary motor and requires the provision of slip rings, to transfer the recovered power out from the rotor.

The present invention is directed to the problem of reducing slip power losses and to powering the auxiliary systems of a LIM vehicle, preferably without requiring sliding connections.

BRIEF SUMMARY OF THE INVENTION

In a transportation system including a track-side LIM primary and a vehicle-borne LIM secondary, the invention involves forming the secondary with a reaction winding that serves as the electric circuit for conduction of currents induced by the moving magnetic field of the primary in the generation of thrust. Conversion means which may typically comprise a rectifier and a storage battery are connected to the winding of the LIM secondary to convert currents generated in the secondary into power for operation of an on-board electrical system which may include lights, fans and other electrical apparatus. In normal operation, slip power which would be dissipated by resistive heating in a conventional reaction plate secondary generates corresponding slip current in the winding of the LIM secondary which can be readily tapped by the conversion means. In many applications, the slip power so recovered may be sufficient to power all on-board electrical equipment.

The invention can include a slip power recovery unit, which controls the amount of slip power recovered. As recovery of slip power will affect LIM thrust, this unit is controlled, in dependence on the requirements for thrust and slip power recovery. The amount of thrust and the amount of recovered power are interdependent quantities, and the system must account for this interdependence through a suitable control algorithm. The recovery unit should enable slip power to be delivered to a load resistor, storage batteries and to vehicle auxiliaries.

By providing LIM slip power recovery onboard the vehicle, two advantages can be achieved. Firstly, the slip power loss can be reduced and the desired thrust characteristics are obtained. Secondly, there can be sufficient power recovered to power the vehicle auxiliaries. To cover periods when the auxiliary load and slip power recovered are mismatched, sufficient battery storage can be provided. By this means, it can be unnecessary to provide sliding contacts, analogous to slip rings of rotary motors, between the vehicle and ground.

It is further to be appreciated that there is no pure transformer action. The recovered slip power will vary in dependence of a number of factors, and in particular the recovered power will have a varying frequency dependent on the slip. This is to be contrasted with known moving transformer proposals for vehicles, where the transformed power is of constant frequency and no thrust is developed.

BRIEF DESCRIPTION OF THE DRAWINGS

For a better understanding of the present invention and to show more clearly how it may be carried into effect, reference will now be made, by way of example, to the accompanying drawings, which show embodiments of the present invention, and in which.

DESCRIPTION OF PREFERRED EMBODIMENT

Figure 1:
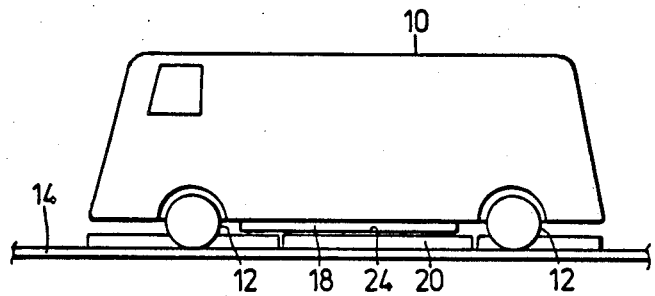
FIG. 1 is a schematic representation of a transportation system including a vehicle fitted with a LIM secondary and adapted to travel along a track constructed with a LIM primary.

Reference is made to FIG. 1 which illustrates a transport system including a vehicle 10 with flanged wheels 12 (only two apparent in the view of FIG. 1) which ride paired rails 14 (only one apparent in the view of FIG. 1) of a track 16. Alternatively, the vehicle could be supported by an air cushion could be a wire guided vehicle or the like fitted with plain, unflanged wheels, or could be magnetically leviated with appropriate modification of the associated track. The vehicle 10 carries on its underside a LIM secondary 18 which is marginally spaced from a three-phase LIM primary 20 constructed in the track 16 between the rails 14. The view of FIG. 1 is intended only as a symbolic representation of a LIM transportation system, and various details of the construction of such a system apart from the present invention will be readily apparent to one skilled in the art.

Figure 2:
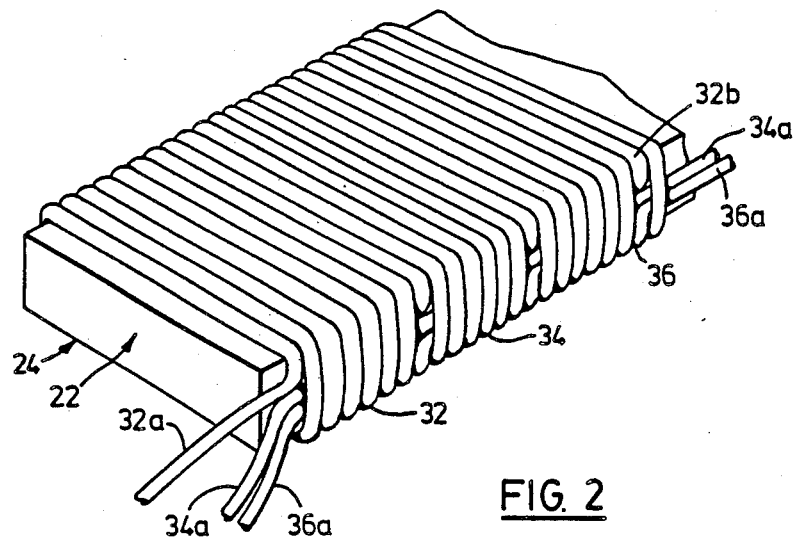
FIG. 2 is a perspective representation of a laminated core and three phase windings of part of a LIM secondary.
Figure 3:
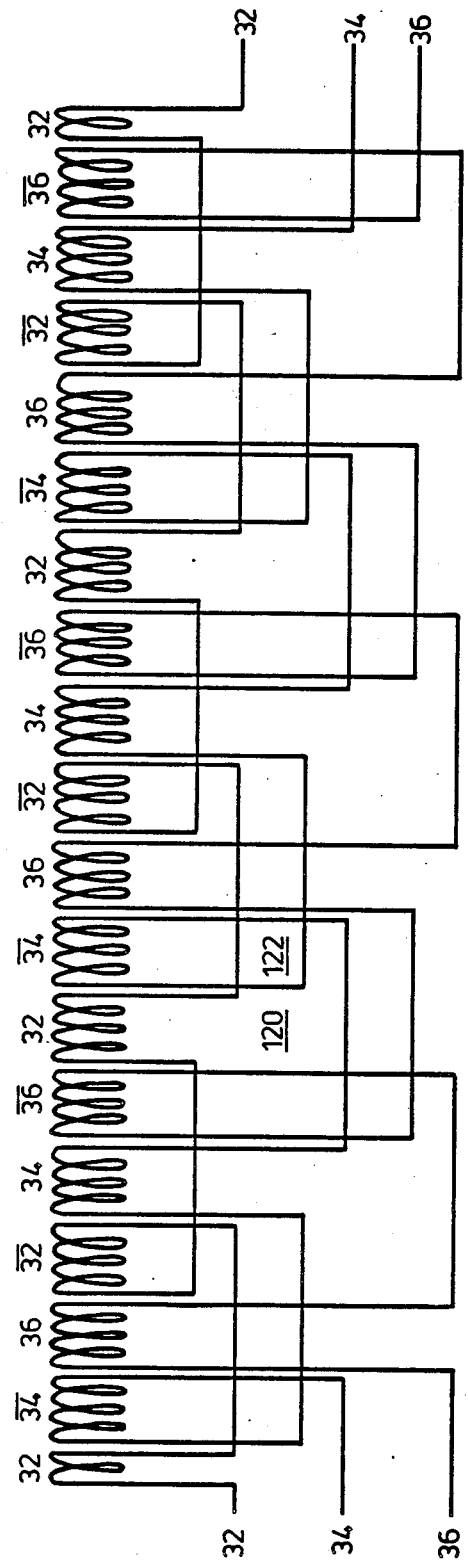
FIG. 3 is a schematic representation of the three-phase winding.

The LIM secondary 18 has the general construction illustrated in FIG. 2. The secondary 20 includes a laminated iron core 22 which forms a magnetic circuit with the primary 20 for conduction of the moving magnetic field generated by the primary 20 in operation. (The use of a laminated iron core 22 is optional). The iron core 22 has a surface 24 which is normally proximately located to an exposed surface of the primary 20 with spacing typically in the order of 5 mm. to 15 mm. Around the iron core 22, there are wound the three phases of a three phase winding 28, these phases being designated 32, 34, 36. The phases 32, 34, 36 are wound as a Gramme winding. In FIG. 2, the mechanical interrelationship of the three phases 32, 34, 36 is shown. For the first phase 32, there are connecting leads, integral with the coil itself, denoted by 32a and 32b, the lead 32b continuing into the next coil. Similarly for the phase 34, there are leads 34a, 34b. For simplicity of manufacture, all the individual coils are wound in the same direction, although as detailed below half the coils are reversed by their connections, relative to the other half. After winding, appropriate connections are made between the coils. The three phases 32, 34, 36 are repeated along the length of the iron core 22. As shown in FIG. 3, in known manner, for each phase, the alternate sections are reversed. This will necessitate further leads being provided, it being necessary to have four longitudinally extending leads at each reversed coil. These additional leads simply extend along the outside of the coils and are made when the interconnections between the coils are made.

Referring to FIG. 3, there is shown the arrangement of the individual coils or sections for each of the phases 32, 34, 36. As shown, alternate sections are reversed and reversed sections designated $\overline{32}$, $\overline{34}$, $\overline{36}$ respectively. Thus, the phase 32 starts with a short coil, of half the length of the other coils, and then has a full, reversed coil. The second phase 34 starts with a reversed coil, whilst the third phase 36 starts with an ordinary coil. This arrangement of the coil sections effectively gives 6 coil sections between pairs of notional poles, as is known (it being appreciated that there are no discrete poles).

Examination of the interconnections between the coil sections 32, 34, 36, $\overline{32}$, $\overline{34}$, $\overline{36}$ shows that alternatively one requires 2 and 4 interconnecting leads. Thus at 120, due to the normal section 32, there are two interconnections. But, at the adjacent section 122, there is a requirement for four interconnections, due to the reversed section 34.

For each full length section 24 turns of No. 15 wire will be used to give a length of 38 mm. For the two short sections 32 at either end, 12 turns of wire will be used to give a length of 19 mm. This will give an overall length of 6.84 m. If these dimensions vary due to tolerance build-up, a single turn can be added or subtracted at a suitable coil to compensate.

As will be appreciated by one skilled in the art, the number of coils and their general construction and dimensioning will of course be dependent on the required thrust characteristics. Alternative coil arrangements can be used. For this winding only the lower half of each coil contributes to the thrust, as the upper half is not cut by the magnetic field. If desired a coil arrangement in which all, or nearly all, of each coil contributes to the thrust can be used.

Figure 5:
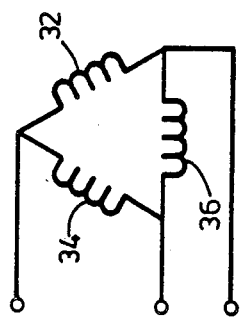
FIGS. 4 and 5 schematically illustrates alternate ways of connecting the winding.
Figure 4:
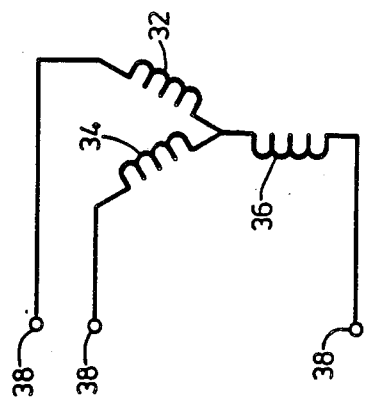

The phase windings 32, 34, 36 are electrically connected in a WYE connection as illustrated in FIG. 4 in which individual phase windings have been represented by the electric symbol for an inductor, although each phase has a number of separate coils. Three terminals 38 will normally be made available to electrically access the individual phase windings. Alternatively, the windings could be connected in the DELTA configuration of FIG. 5. The windings of the secondary will normally correspond in connection type and general dimensioning to the windings of the primary 20.

Figure 6:
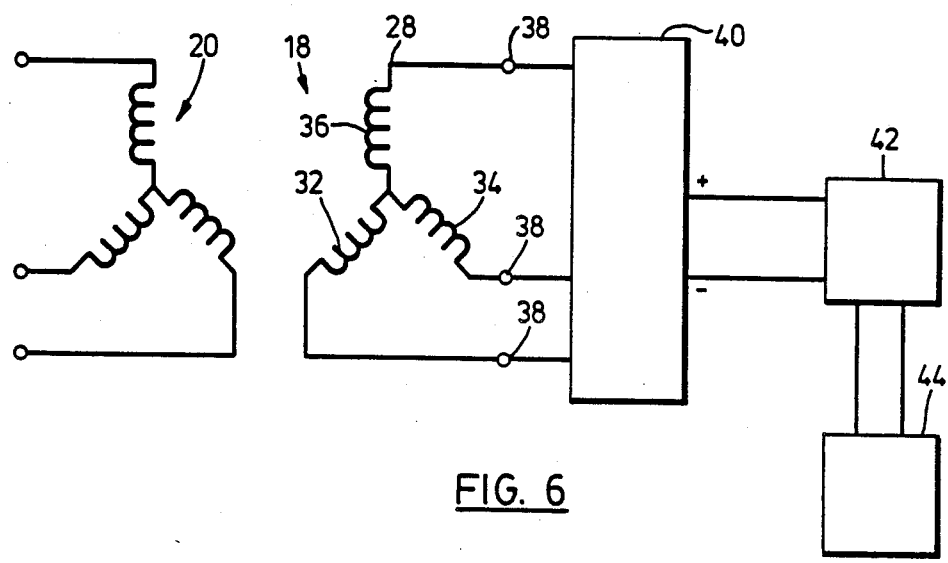
FIG. 6 is a schematic representation of the LIM primary and secondary and apparatus for powering an on-board electrical system with slip power generated in the LIM secondary.

FIG. 6 is a schematic representation of the LIM system together with apparatus for recovering slip power. In the view of FIG. 6, the primary 20 is shown as a WYE-connected three-phase winding, whilst the secondary 18 is shown as a three-phase winding 28. The primary and secondary 18, 20 are generally coupled. The terminals 38 of the secondary winding 28 are connected to a three-phase controlled rectifier bridge 40 which charges a set of storage batteries 42. The storage batteries 42 are in turn connected to an on-board electrical system of the vehicle 10, which system 44 may typically include lights and fans.

In operation, the winding 18 conducts current induced by the moving magnetic field generated by the primary. This current will include current required for production of thrust together with a slip current whose energy would normally be dissipated as heat in a conventional reaction plate secondary. The slip current is recovered by the rectifier bridge 40 and stored in the storage battery 42 to power the electrical system 44. The impedance of the rectifier bridge ideally would not effect the thrust characteristics of the winding 28; however, in practice, some nominal effects may be experienced due to the finite impedance inherent in the bridge.

It is appreciated that the recovered slip power, which has a varying voltage and frequency, could be used in many ways. Instead of charging batteries it could directly power a vehicle system, e.g. a pneumatic system.

Although a D.C. type electrical system has been illustrated involving the rectifier bridge 40 and storage batteries 42, the system could be adapted to convert the power stored in the batteries 42 into alternating current if required.

To further explain the present invention, reference will now be made to FIGS. 7-10. In these figures, modified equivalent circuits are shown, to explain the behaviour of the slip power recovery system.

Figure 7:
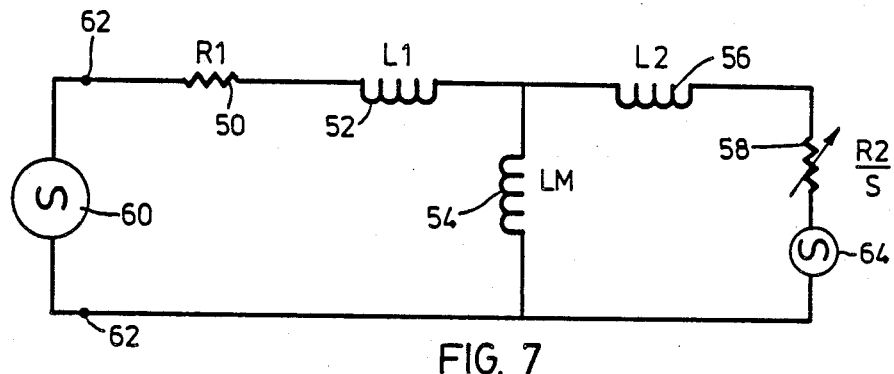
FIG. 7 shows schematically an equivalent circuit, including the effect of slip power recovery per phase.

With reference to FIG. 7, there is shown an equivalent circuit for an induction motor. The various components are given their common designations, to facilitate understanding. Thus, a primary resistance 50 and a primary inductance 52 are also marked R1 and L1 respectively. An inductance 54, for the magnetizing current, is marked LM. For the secondary circuit, an inductance 56 and a variable resistance 58 are respectively marked L2 and R2/S. The resistance 58 is inversely proportional to the slip speed s; this results from the fact that the secondary voltage is proportional to the slip speed s. The components 50-58 are standard for an equivalent circuit model for an induction motor. The input power source is indicated at 60, connected to terminals 62 of the primary circuit.

This standard equivalent circuit model is modified by the inclusion of a voltage source 64 in the secondary branch. This voltage source 64 represents slip power recovery, and the voltage applied by it to the equivalent circuit opposes current flow.

The effect of this secondary voltage source 64 can be substantial. It can significantly alter the thrust/speed characteristic of the motor. Consequently, consideration of the effect of the voltage source 64 must be taken into account when designing the power recovery system.

Figure 8:
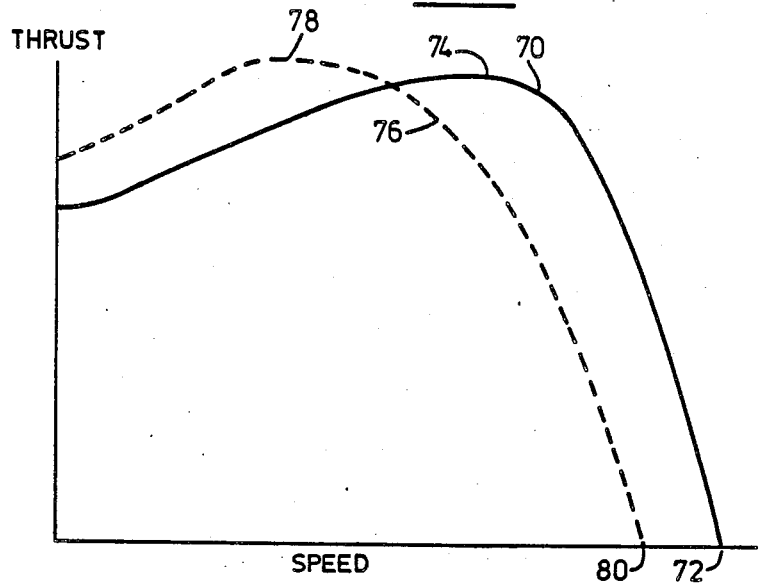
FIG. 8 shows a graph showing thrust variation when slip power is recovered.

FIG. 8 shows schematically the possible effect of the secondary voltage source 64. The solid line 70 shows the variation of thrust with speed for a standard linear induction motor. After reaching a peak at 74, the thrust drops down until it reaches 72, which is the synchronous speed. When slip power recovery is effected, and the equivalent voltage source 64 is considered in the equivalent circuit model, the thrust/speed characteristic is that indicated by the dotted line 76. Here, the maximum thrust is reached at a lower speed. Again, the thrust then falls away, and reaches a zero value at 80. This is at a speed below the synchronous speed, so one has zero thrust at a discrete slip speed. Such a situation cannot occur in a standard 3-phase induction motor; in a standard motor, the thrust can only be zero at the synchronous speed when the slip is zero.

Figure 9:
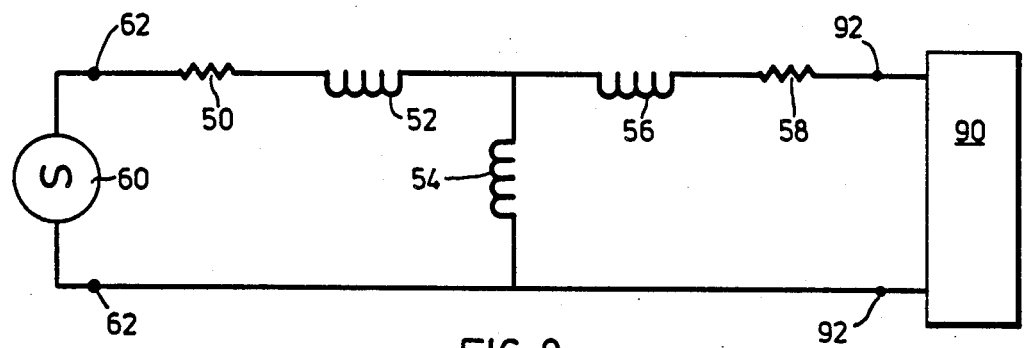
FIG. 9 shows schematically an equivalent circuit including a slip power recovery unit for one phase.
Figure 10:
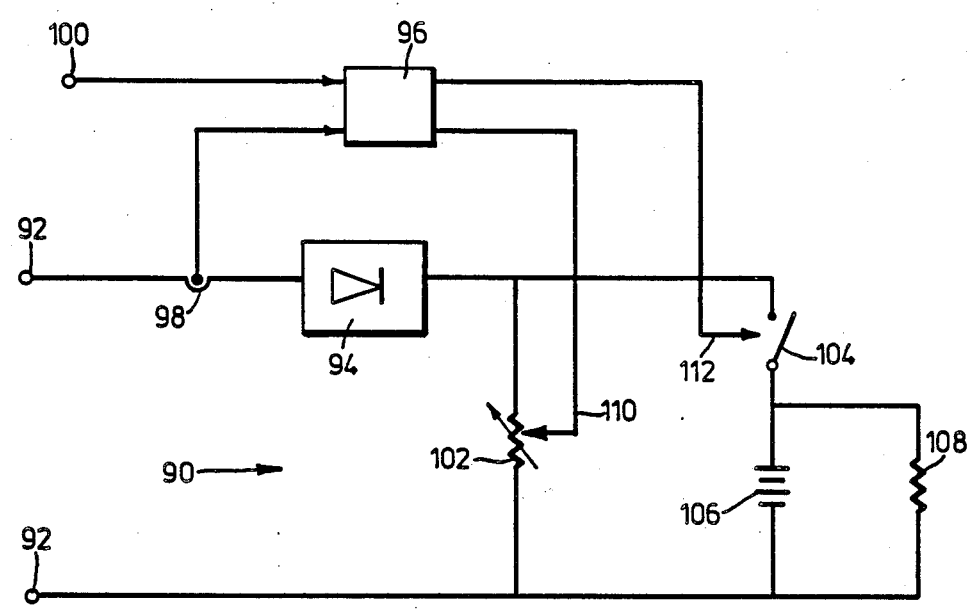
FIG. 10 shows diagrammatically details of a slip power recovery unit.

In view of this possibly considerable effect on the thrust characteristic, it is desirable that the slip power recovery is controlled. FIGS. 9 and 10 show means for controlling its recovery.

In FIG. 9, there is shown an equivalent circuit, generally corresponding to that of FIG. 7, with like parts being given the same reference numerals. Here, however, the voltage source 64 is omitted, and instead a slip power recovery unit 90 is shown connected at terminals 92 to the rest of the secondary circuit.

FIG. 10 shows this slip power recovery unit 90 in greater detail.

The top terminal 92 is connected to an input of a rectifier 94. Also, a load control logic 96 is connected to a current sensor 98, for sensing current flow to the rectifier 94. An input 100 is provided for supplying the load control logic 96 with the current demanded by the vehicle. The rectifier is connected to a variable load resistor 102 and to a control switch 104. This load switch 104 is itself connected to storage batteries 106 in the vehicle and vehicle auxiliaries indicated by a resistor 108. To complete the circuit, the components 102, 106, 108 are connected to the other terminal 92. As indicated schematically by arrows 110, 112 the load control logic 96 controls the variable resistor 102 and the switch 104.

Thus, this slip recovery unit 90 enables the slip power recovered to be controlled, as desired. Normally, the vehicle batteries 106 and auxiliaries 108 absorb most of the slip power. However, the conditions may be such that either more or less slip power are required. A provision to route excess power to the variable load resistor 102, enables excess slip power to be absorbed. On the other hand, when it is necessary to reduce the slip power recovered, e.g. to ensure a desired thrust is provided, then the switch 104 can be opened. With the switch 104 open, the vehicle auxiliaries 108 can be run from the batteries 106. Known control circuitry can be provided for this and it is not described in greater detail here.

It should be noted that the equivalent circuits of FIGS. 7 and 9 and the slip power recovery unit of FIG. 10 are, for simplicity, shown for a single phase or on a "per phase" basis. In practice, three phases are usually used, and thus the circuits should show all three phases. Further, for three phases, the rectifier shown here diagramatically at 94 would, typically be a three-phase bridge rectifier, possibly controlled.

Whilst the described embodiment has been in relation to a vehicle arranged to run along a track, it can be applied to a vehicle that runs on a surface and is guided, to follow the LIM primaries, by some other means.

I claim:

1. A transportation system including a linear induction motor primary for generation of a moving magnetic field along a path and a vehicle fitted with a linear induction motor secondary so that the vehicle is propelled along the path by the moving magnetic field, the vehicle having an on-board electrical system including lights, fans or other electrical apparatus, the secondary comprising a reaction winding in which current is induced by the moving magnetic field for generation of thrust, the vehicle including conversion means connected to the winding to convert current induced in the winding into electrical power for operation of the on-board electrical system whereby slip power in the secondary can be converted into electrical power for operation of the on-board electrical system;

and the vehicle also including a slip power recovery unit for controlling the recovery of slip power, said slip power recovery unit including a rectifier, a load resistor, storage means for storing rectified current, and means enabling the output of the rectifier to be connected selectively to one or more of the load resistor, the storage means and the on-board electrical system.

2. A system as claimed in claim 1, which further includes a load control logic, which senses current supply to the rectifier, has an input for current demand of the vehicle on-board electrical system, and controls the load resistor and distribution of the output of the rectifier.

3. A system as claimed in claim 1, which is a three-phase system, with both the winding being a three phase winding and the rectifier being a three-phase rectifier.

4. A vehicle for use along a path fitted with a linear induction motor primary for generation of a moving magnetic field, the vehicle being fitted with a linear induction motor secondary so that the vehicle is propelled along the path by the moving magnetic field and the vehicle having an on-board electrical system including lights, fans or other electrical apparatus, the secondary comprising a reaction winding in which current is induced by the moving magnetic field for generation of thrust;

the vehicle including conversion means connected to the winding to convert current induced in the winding into electrical power for operation of the on-board electrical system whereby slip power in the secondary can be converted into electrical power for operation of the on-board electrical system, and the vehicle also including a slip power recovery unit for controlling the recovery of the slip power, said slip power recovery unit including a rectifier, a load resistor, storage means for storing rectified current, and means enabling the output of the rectifier to be connected selectively to one or more of the load resistor, the storage means and the on-board electrical system.

5. A vehicle as claimed in claim 4, which further includes a load control logic, which senses current supply to the rectifier, has an input for current demand of the vehicle on-board electrical system, and controls the load resistor and distribution of the output of the rectifier.

6. A vehicle as claimed in claim 4 wherein the winding is a three phase winding and the rectifier is a three phase rectifier.

* * * * *